W. H. STICKLE.
Vehicle-Spring.

No. 213,466. Patented Mar. 18, 1879.

WITNESSES:
C. Neveux
C. Sedgwick

INVENTOR:
W. H. Stickle
BY Munn & Co
ATTORNEYS.

UNITED STATES PATENT OFFICE.

WILLIAM H. STICKLE, OF TERRE HAUTE, INDIANA.

IMPROVEMENT IN VEHICLE-SPRINGS.

Specification forming part of Letters Patent No. 213,466, dated March 18, 1879; application filed December 21, 1878.

*To all whom it may concern:*

Figure 1:
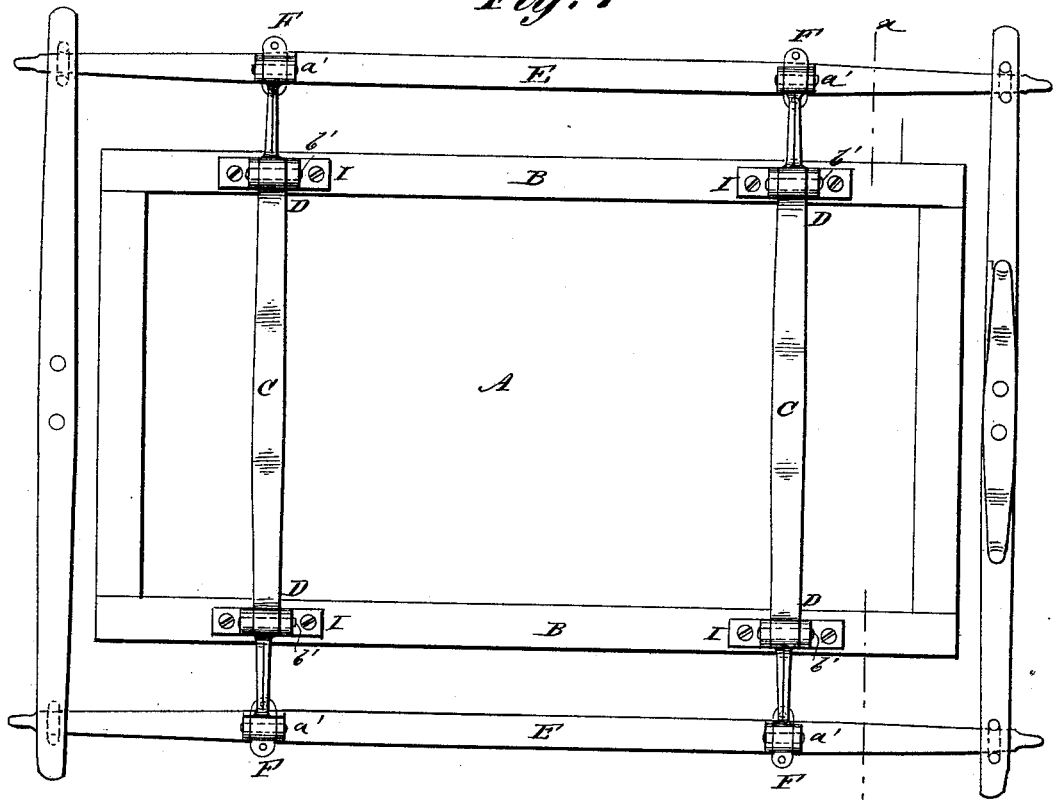
Figure 2:
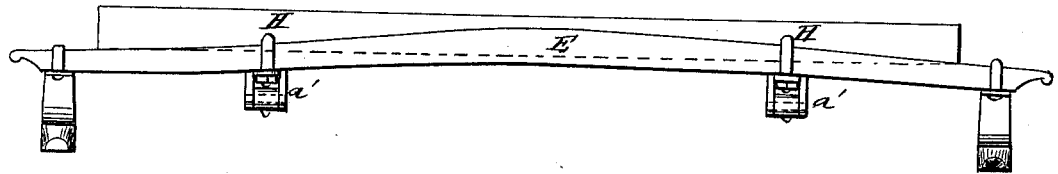
Figure 3:
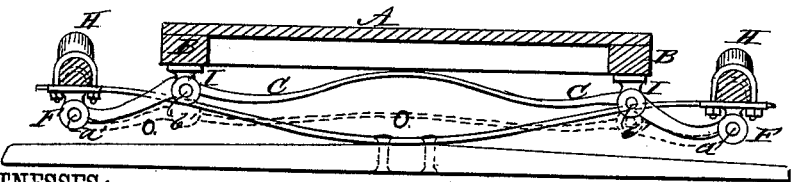

Be it known that I, WILLIAM H. STICKLE, of Terre Haute, in the county of Vigo and State of Indiana, have invented a new and useful Improvement in Carriage - Springs, of which the following is a specification:

Figure 1 is a plan view of the under side of the floor or bottom of the carriage with the springs in position. Fig. 2 is a side elevation. Fig. 3 is a sectional elevation through $x\ x$.

Similar letters of reference indicate corresponding parts.

A is the floor or bottom of the vehicle. B B are the sills. C C are the cross-springs or levers, upon which the body of the vehicle rests. These springs are each of one piece of metal throughout their length, and are flexible from D to D, whence they are prolonged into rigid goose-necks.

E E are the side bars, to which shackles F F F F are attached by clips H H, and through the lugs of the shackles are pins $a'\ a'$, which hold the ends of the springs C C.

Shackles I I I I, which are bolted to sills B B, receive the shanks of the goose-necks, and hold them in position with pins $b'\ b'$, upon which the springs pivot and oscillate.

The cross-springs or levers C C are of flexible tempered steel, arched at the center, as will be seen, receive their load at the shackles J I I I, and have their fulcrums in shackles F F F F.

It is plainly obvious that as the load presses down at I I, the springs will assume the form and position shown by the dotted lines O O, and that when the pressure is removed they will change position, oscillating on their pivots $a'\ a'$ and $b'\ b'$, and keeping up a reciprocating motion as they are pressed and relieved alternately at the points I I.

This invention overcomes all the swaying side motion, the jostling and bumping, and the ducking down of the ends of the body of the vehicle, which are so unpleasant to the occupants of vehicles ordinarily. It is of simple and durable construction, and can be advantageously applied to various styles of vehicles.

Having thus described my invention, I claim as new and desire to secure by Letters Patent—

1. The combination of the flexible levers or springs C C, with rigid goose-necks, with the shackles I I I I at four points on the bottom of the vehicle-body, substantially as herein shown and described.

2. The combination of the flexible levers or springs C C, with rigid goose-necks, with the shackles I I I I and the shackles F F F F, connected with the side bars, arranged and operating substantially as and for the purpose described.

WILLIAM HENRY STICKLE.

Witnesses:
JOHN WHITAKER,
JOHN E. TOBIN.